United States Patent [19]

Smyk et al.

[11] Patent Number: 4,992,209

[45] Date of Patent: Feb. 12, 1991

[54] METHOD FOR INHIBITING CORROSION IN COOLING SYSTEMS AND COMPOSITIONS THEREFOR, CONTAINING A NITRITE CORROSION INHIBITOR AND BROMOSULFAMATE

[75] Inventors: Eugene B. Smyk, Coal City; Chris R. Smyrniotis, St. Charles; Christopher L. Wiatr, Naperville, all of Ill.

[73] Assignee: Nalco Chemical Company, Naperville, Ill.

[21] Appl. No.: 427,535

[22] Filed: Oct. 26, 1989

[51] Int. Cl.[5] ............................................. C23F 11/08
[52] U.S. Cl. .................................. 252/387; 252/389.62
[58] Field of Search ............... 252/388, 392, 391, 387, 252/389.62; 423/388

[56] References Cited

U.S. PATENT DOCUMENTS 4,476,930  10/1984  Watanabe ............................ 252/392
4,642,194  2/1987  Johnson .
4,711,724  12/1987  Johnson .
4,759,852  7/1988  Trulear .

Primary Examiner—Robert L. Stoll
Assistant Examiner—Valerie D. Fee
Attorney, Agent, or Firm—John S. Roberts, Jr.; Donald G. Epple

[57] ABSTRACT

The method of adding to a nitrite corrosion inhibitor composition an effective amount of a bromosulfamate which is stable with respect to the nitrite corrosion inhibitor and provides an effective biocide, bactericide and fungicide. The composition using this bromosulfamate component to nitrite is utilized at about 0.1 to 10 ppm (residual) with an optimum of about 0.2 ppm of bromosulfamate. The bromosulfamate composition comprises reacting together sodium bromide (NaBr), sodium hypochlorite (NaOCl) or chlorine, and sodium sulfamate ($NaSO_3NH_2$) or sulfamic acid, and using the product "fresh" in treating the nitrite solution.

5 Claims, No Drawings

METHOD FOR INHIBITING CORROSION IN COOLING SYSTEMS AND COMPOSITIONS THEREFOR, CONTAINING A NITRITE CORROSION INHIBITOR AND BROMOSULFAMATE

The term nitrite corrosion inhibitor applies to a wide group of inhibitors useful in industry, in metals such as steel, in closed and open recirculating systems of many types. These inhibitors, which contain nitrite, usually contain as an active ingredient a water-soluble nitrite salt, such as sodium nitrite. These nitrites may be converted to molecular nitrogen or ammonia by denitrifying bacteria and fungi. The present invention is designed to solve a problem presented in the art of how to keep the effective strength of the nitrite containing corrosion inhibitor composition in the presence of deleterious bactericides and fungicides.

The bromosulfamate compound specifically is one of a class of compounds constituting antimicrobial agents with particular reference as a bactericide and fungicide. Chlorine, bromine, and iodine compounds have been utilized, but the novelty is narrowing utilization to uncover a compound which is inert to or does not oxidize the nitrite corrosion inhibitor composition. The preferred bromosulfamate utilized as a liquid is preferably used in a range of about 0.1 to 10 ppm (residual) with an optimum of about 0.2 ppm.

The feed amount of the bromosulfamate which is the input of the treatment compound to the nitrite composition is 5 ppm. The residual is that product which is left of the bromosulfamate after mixing with the nitrite composition.

The bromosulfamate treatment composition is prepared from sodium bromide, sodium hypochlorite (or chlorine), and sodium sulfomate (or sulfamic acid) mixed together at ambient temperature or higher. The product bromosulfamate is prepared and utilized "fresh," where "fresh" is defined as up to five hours, as a biocide in the nitrite solution and therefore must be used soon after preparation.

BACKGROUND OF THE INVENTION

The prior art points out a few distantly related patents as follows:

"Method for Prevention of Phosphonate Decomposition by Chlorine," U.S. Pat. Nos. 4,642,194 and 4,711,724; also "Use of Sulfamic Acid to Inhibit Phosphonate Decomposition by Chlorine-Bromine Mixtures," U.S. Pat. No. 4,759,852.

The sulfamate form noted in the '852 patent halts decomposition of phosphonates, whereas the bromide does not, and the application is to the decomposition of the phosphonates which is not in the present invention. However, the art shown above in the patents noted does not teach the idea of adding bromosulfamate, which does not oxidize nitrite and has excellent biocidal properties.

Example I

This method has been tested on small scale where bromine residuals could be maintained without destroying nitrite. A test showed that without sulfamic acid, nitrite was destroyed when bromine was added to the system. Previous tests showed that chlorine destroyed nitrite and that chlorosulfamate did not destroy nitrite. However, chlorosulfamate is not as strong a microbiocidal agent as bromosulfamate, and the bromosulfamate compound is preferred.

Two pilot cooling tower tests have further confirmed these results. Test results:

| System | Oxidant Residual (ppm) | % $NO_2$-Oxidized |
| --- | --- | --- |
| Chlorine | 0.20 | >90% |
| Bromine | 0.20 | >90% |
| Chlorosulfamate | 0.05 | <10% |
| Bromosulfamate | 0.20 | <10% |

In these tests, when chlorine was used as the biocide, fed at approximately 50 ppm, 0.2 ppm of chlorine residual was maintained, but >90% of the nitrite was oxidized.

A similar result occurred when bromine was used, fed at approximately 50 ppm, 0.2 ppm of bromine residual was maintained, but >90% of the nitrite was also oxidized.

When chlorosulfamate was used, fed at approximately 5 ppm, only a trace, or about 0.05 ppm, of chlorine residual was maintained, but less than 10% of the nitrite was oxidized.

Utilizing bromosulfamate, fed at approximately 5 ppm, maintained 0.2 ppm of bromosulfamate residual, and less than 10% of the nitrite was oxidized.

The concentration of feed for chlorosulfamate and bromosulfamate was much less than the concentration of feed for the chlorine and bromine.

It should be pointed out that bromosulfamate is at least equal to chlorine and bromine in oxidant residual recovery, but chlorine and bromine are not useful biocides in the system because they destroy nitrite. Chlorosulfamate does not destroy nitrite but is not as effective a biocide as bromosulfamate.

Example II

Preparation of the Bromosulfamate Treatment Composition

50–200 grams of sodium bromide, NaBr, was added to 75 grams of sodium hypochlorite, NaOCl. After mixing the solution for 15–60 seconds, 50–200 grams of sodium sulfamate, $NaSO_3NH_2$, was added to the solution. The resulting composition was usable as a biocide.

This procedure is all prepared in solution. Additionally, it has been found that "fresh" treatment composition is of great importance since the oxidizing biocide system is not stable to be transported or preserved.

We claim:

1. A method of inhibiting corrosion comprising adding to a cooling system containing a nitrite corrosion inhibitor of an effective amount of bromosulfamate as a bactericide and fungicide.

2. The method of claim 1 wherein the effective amount of bromosulfamate is about 0.1 to 10 ppm (residual) with an optimum of about 0.2 ppm.

3. A nitrite containing corrosion inhibitor composition containing an effective amount of a bromosulfamate as a bactericide and fungicide.

4. The composition according to claim 3 wherein the effective amount of bromosulfamate is about 0.1 to 10 ppm (residual) with an optimum of about 0.2 ppm.

5. A method of making a nitrite containing corrosion inhibitor comprising adding the reaction product of sodium bromide, sodium hypochloride or chlorine and sulfamate as a fresh solution wherein fresh is defined as being produced in one to 5 hours.

* * * * *